United States Patent Office 3,367,930
Patented Feb. 6, 1968

3,367,930
PROCESS FOR THE PREPARATION OF
HETEROCYCLIC COMPOUNDS
Jean Schmutz, Muri, near Bern, Fritz Hunziker, Bern,
Othmar Schindler, Gurzelen im Einschlag, and Franz
Martin Künzle, Bern, Switzerland, assignors to Dr. A.
Wander, S.A., Bern, Switzerland, a Swiss corporation
No Drawing. Filed Sept. 24, 1964, Ser. No. 399,096
4 Claims. (Cl. 260—239.3)

ABSTRACT OF THE DISCLOSURE

A process of preparing heterocyclic compounds having the general formula:

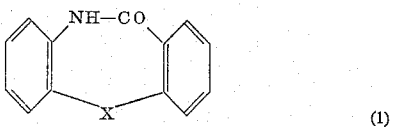

wherein X denotes a member of the group consisting of oxygen, sulfur, methylene, ethylene, substituted methylene, and substituted ethylene, and (B) derivatives of (A) which contain in one or both benzene nuclei one or several substituents; which comprises subjecting isocyanates of the general formula:

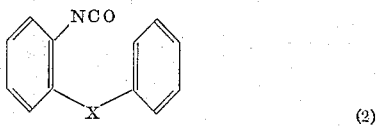

wherein X has the above-mentioned meaning, or derivatives thereof which contain substituents in one or both benzene nuclei, to cyclization by treatment with a condensing agent, such as aluminum chloride.

The heterocyclic compounds produced by the foregoing process can be used as intermediates for preparing pharmaceuticals in accordance with the prior art teachings.

---

The object of this invention is a process for preparing heterocyclic compounds of the formula:

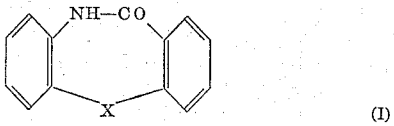

wherein X denotes oxygen, sulfur, methylene, ethylene, substituted methylene, or substituted ethylene, such as monoalkylated or dialkylated methylene or ethylene, and which may contain in one or both benzene nuclei one or several substituents such as halogen, hydroxyl, nitro, trifluoromethyl, alkyl, alkoxy, alkylthio or similar residues.

Compounds of Formula I have so far been prepared, according to the bridging link X, by the following methods:

To make 10,11 - dihydro - 11 - oxo - dibenzo[b,f][1,4] thiazepines (Formula I, $X=S$), N-benzenesulfonylbenzisothiazolones were reacted with amines (E. W. McClelland and R. H. Peters: J. Chem. Soc. 1947, 1229). The yields obtained in this way are, however, small; in addition, substituted derivatives are partly difficult or even impossible to prepare by this method.

These compounds have further been obtained by lactamizing 2 - amino - 2' - carboxydiphenylsulfides [E. W. McClelland and R. H. Peters, loc. cit.; V. Hach and M. Protiva: Coll. Czeck. Chem. Comm. 23, 1941 (1958); M. Protiva and V. Hach: Coll. Czeck. Chem. Comm. 24, 207 (1959); R. Jaques, A. Rossi, E. Urech, H. J. Bein and K. Hoffmann: Helv. Chim. Acta 42, 1265 (1959)]. Also by this method various mono-substituted and especially disubstituted derivatives are difficult to obtain, because the necessary starting materials cannot be prepared by usual methods.

10,11 - dihydro - 11 - oxo - dibenz[b,f][1,4]oxazepines (Formula I, $X=O$) have been obtained by lactamizing 2-amino-2'-carboxydiphenyloxides [W. D. Maclay and C. S. Hamilton: J. Amer. Chem. Soc. 54, 3310 (1932); R. Q. Brewster and F. Strain: J. Amer. Chem. Soc. 56, 117 (1934); M. Tomita and T. Kitamura: J. Pharm. Soc. Japan 75, 1138 (1955) from Chem. Abstr. 50, 5561 f (1956); M. Allen and R. Y. Moir; Canad. J. Chem. 37, 1799 (1959)], which in turn may be prepared by reducing corresponding 2-nitro-2'-carboxydiphenyloxides. The preparation of the latter by condensing o-nitrohalogenbenzenes with salicylic acid esters affords, however, only small yields which in most cases are considerably inferior to 20% of the theoretical value. It has therefore already been proposed to condense o-nitrohalogenbenzenes with o-cresol and then to oxidize the methyl residue into the carboxylic residue [M. Tomita and T. Kitamura, loc. cit.], which is a rather complicated proceeding. For the preparation of 10,11 - dihydro - 11 - oxo - dibenz[b,f] [1,4]oxazepines substituted in the benzene nuclei, the suitability of this method depends furthermore on the possibility of obtaining correspondingly substituted salicyclic acid esters, which in various cases are difficult to obtain.

5,6 - dihydro - 6 - oxo - 11H - dibenz[b,e]azepines (5,6-dihydro - 6 - oxo-morphanthridines; Formula I, $X=$methylene or substituted methylene) have been obtained by catalytic reduction of 5,6 - dihydro - 6,11 - dioxo - 11H-dibenz[b,e]azepines (5,6 - dihydro - 6,11 - dioxo-morphanthridines) with copper chromite [G. Wittig, G. Closs and F. Mindermann: Liebigs Ann. Chem. 594, 88 (1955)] or palladium carbon [L. H. Werner, French patent specification 1,216,631; Chem. Zbl. 133, 8349 (1962); see Belgian patent specification 547,449, German patent specification 1,145,618 and U.S. patent specification 2,973,354]. In addition to the fact that difficulties may arise in hydrogenating selectively the 11-oxo group, it is also difficult to obtain the oxo compounds needed as starting materials. The latter can be obtained by Beckmann's rearrangement of anthraquinonemonoxime [E. Beckmann and O. Liesche: Ber. Dtsch. Chem. Ges. 56, 17 (1923)], by Schmidt's reaction of anthraquinones [L. H. Werner, French patent specification 1,216,631], by treatment of phthalic acid arylamides with aluminium-chloride [German patent specification 551,256], or by lactamizing 2 - (2' - aminobenzoyl) - benzoinc acid [P. Kränzlein: Ber. Dtsch. Chem. Ges. 70, 1952 (1937); W. Bradley and H. E. Nursten: J. Chem. Soc. 1951, 2170]. The two first-mentioned methods are inasmuch disadvantageous as, when using starting compounds which are substituted in the benzene nuclei, mixtures of isomers are obtained which in part cannot easily be separated. The 2-(2'-aminobenzoyl)-benzoic acid and its substituted derivaties required in the last-mentioned method can as well only be obtained through mixtures of isomers or are, in part, not obtainable at all.

Of the eight-membered compounds according to Formula I, the sole compound known heretofore was 5,6,11, 12 - tetrahydro - 6 - oxo - dibenz[b,f]azocine ($X=$ethylene) [A. M. Monro, R. M. Quinton and T. I. Wrigley: J. Med. Chem. 6, 255 (1963)], which was obtained by reaction of dibenzyl-o-carboxylic acid with aluminum chloride to form 10,11-dihydro-dibenzo[a,d]cyclohepten-5-one, transformation of the latter into the corresponding oxime, and Beckmann's rearrangement of the oxime. However, when using starting compounds which are substituted in the benzene nuclei, this method affords mixtures of isomeric products which, in part, are difficult to separate.

It has now been discovered that heterocyclic compounds according to Formula I, and also especially the derivatives thereof substituted in the benzene nuclei, can be obtained in a simple way and with a high, mostly quantitative yield, if isocyanates of the formula:

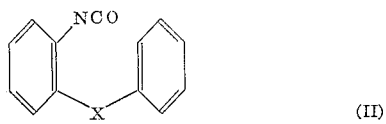

(II)

wherein X has the above-mentioned meaning and one or both benzene nuclei can contain substituents such as halogen, hydroxyl, nitro, trifluoromethyl, alkyl, alkoxy, alkylthio or similar residues, are subjected to cyclization by treatment with a condensing agent, especially with aluminium chloride or polyphosphoric acid. The cyclization is performed preferably at temperatures between about 80 and about 160° C. in a solvent having a correspondingly high boiling point, e.g. o-dichlorobenzene, using anhydrous aluminium chloride as the condensing agent. Besides o-dichlorobenzene other inert solvents can be used, especially those which are usual for Friedel-Crafts-condensations, e.g. carbon disulfide, carbon tetrachloride, ethane tetrachloride, nitrobenzene, dioxane, ligroine and similar compounds. One should however consider that in many cases no maximum yields are assured with reaction temperatures below 80° C., so that if solvents with a lower boiling point are used, it may be preferable to work under pressure. As condensing agents one can use, besides those that have already been mentioned, the usual catalysts for Friedel-Crafts-condensations, such as tin tetrachloride, antimony pentachloride, boron trifluoride, zinc dichloride, ferrichloride, hydrofluoric acid, phosphorus pentoxide, and similar compounds.

When using starting materials of Formula II, which are unsymmetrically substituted in the benzene nucleus that does not bear the isocyanate residue, the cyclization according to the present process can possibly lead to two different isomers, which are generally easy to separate by the usual methods, e.g. by fractionated crystallization. In this way e.g. starting from 2-isocyanato-3'-chloro-diphenyloxide, 1-chloro-10,11-dihydro-11-oxo-dibenz[b,f][1,4]oxazepine as well as the corresponding 3-chloro-compounds are obtained in a ratio of about 1:4. These compounds can be separated by fractionated crystallization from pyridine (see Example 3). It is evident that in these circumstances the yield obtained with this method, which is practically quantitative, is for the sum of the two isomers.

The substituents contained in the starting material not being inert in the conditions of the process can have a negative influence on the yield, e.g. methoxy residues may become partially demethylated so that one obtains a mixture of the corresponding methoxy and hydroxy derivatives of the product of Formula I; the hydroxy derivative can easily be re-methylated in the usual manner.

The isocyanates needed as starting compounds are obtained in practically quantitative yield from the corresponding amines by treatment with phosgene, preferably by using toluene as a solvent. They are colourless oils which can be distilled without being decomposed.

The products obtained through our process are in part already known, in part new compounds, which can be used especially as intermediates to prepare among other things pharmaceutical agents, particularly in the fields of chemotherapeutics and of psychopharmacology, as well as dyes (see e.g. German patent specifications Nos. 1,018,422 [U.S. Patent No. 2,852,510] and 1,145,618 [U.S. Patent No. 2,973,354], and Swiss patent applications Nos. 13/63 [Swiss Patent No. 420,155] and 7,774/63).

*Example 1*

98 g. of anhydrous aluminium chloride in 900 ml. of o-dichlorobenzene are heated to 90–100° C. while being stirred. Within 15 minutes a solution of 183.2 g. of 2-isocyanato-4'-chlorodiphenylsulfide in 600 ml. of o-dichlorobenzene is added drop by drop, causing the temperature to rise to 110–120° C. Then the mixture is heated within one hour to 150° C., cooled and poured on to ice. The obtained mixture is subjected to distillation with steam. The residue is isolated by filtration and boiled with 700 ml. of acetone. One obtains 181 g. (98% of the theoretical yield) of crystals which are difficultly soluble in the usual organic solvents. After being recrystallized from chloroform the product has a melting point of 260–262° C. The compound can be identified as 2-chloro-10,11-dihydro-11-oxo-dibenzo[b,f][1,4]thiazepine by means of its melting point, its mixed melting point and its infra-red spectrum (potassium bromide) in comparison to the product obtained by thermic cyclization of 2-amino-2'-carbomethoxy-4'-chloro-diphenylsulfide.

To prepare 2-isocyanato-4'-chloro-diphenylsulfide, used as a starting material in this example, a solution cooled down to —5 to 0° C. of 83 g. of 2-amino-4'-chloro-diphenylsulfide in 650 ml. of absolute toluene is poured drop by drop in 330 ml. of a stirred 20% phosgene solution in absolute toluene kept at —10° C. The obtained paste, which can easily be stirred, is slowly heated to reflux temperature while introducing a weak stream of phosgene. This operation leads to a clear solution. 15 minutes later, nitrogen is adducted to eliminate excess phosgene, and the toluene is distilled off. One obtains as residue 91.5 g. (98% of the theoretical yield) of 2-isocyanato-4'-chlorodiphenylsulfide in the form of a colourless oil having a boiling point of 140–145° C./0.07 Hg, which solidifies into crystals with a melting point of 37–40° C.

*Example 2*

166.9 g. of 2-isocyanato-diphenyloxide are subjected to cyclization with 111 g. of anhydrous aluminium chloride in 1000 ml. of o-dichlorobenzene and the reaction mixture is worked up, using the same procedure as in Example 1. By crystallization from glacial acetic acid, 163.5 g. (98% of the theoretical yield) of 10,11-dihydro-11-oxo-dibenz-[b,f][1,4]oxazepine are obtained in the form of colourless crystals, melting point 215–217° C. By its melting point, mixed melting point and infra-red spectrum (potassium bromide) the product is found to be identical with a compound obtained by thermic cyclization of 2-amino-2'-carbomethoxydiphenyloxide.

*Example 3*

143.2 g. of 2-isocyanato-3'-chloro-diphenyloxide (boiling point 125–130° C./0.07 Hg) are subjected to cyclization by treatment with 81.5 g. of anhydrous aluminium chloride in 1000 ml. of o-dichlorobenzene in the manner described in Example 1. There are obtained 145 g. of a mixture with a melting point of 215–250° C., which is dissolved in 2500 ml. of pyridine, treated with carbon and subjected to fractional crystallization. One obtains in this way 110.5 g. of 3-chloro-10,11-dihydro-11-oxo-dibenz[b,f][1,4]oxazepine, which upon recrystallization from pyridine forms needles having a melting point of 266–267° C. By evaporating the mother liquor a residue is obtained consisting of a mixture of needles and prisms having a melting point of 210–260° C. When crystallized from glacial acetic acid this residue yields 18 g. of 1-chloro-10,11-dihydro-11-oxo-dibenz[b,f][1,4]oxazepine in the form of prismatic crystals with a melting point of 251–255° C.

*Example 4*

13 g. of anhydrous aluminium chloride are heated in 65 ml. of o-dichlorobenzene to a temperature of 80° C. A solution of 20.2 g. of 2-isocyanato-4-chloro-diphenylmethane in 45 ml. of o-dichlorobenzene is added drop by drop while stirring the reaction mixture, which reaches a temperature of 105° C. The reaction mixture is then stirred for one hour at 120° C., cooled to room temperature and poured on to 150 ml. of 2-n hydrochloric acid. The mixture obtained is subjected to distillation with steam. The resulting colourless crystals are isolated by filtration, washed with water and dried in vacuo at 80° C. By recrystallization from glacial acetic acid, one obtains 19.5 g. (95% of the theoretical yield) of 3 - chloro - 5,6 - dihydro - 6 - oxo - 11H - dibenz[b,e] azepine, having a melting point of 273–275° C.

The 2 - isocyanato - 4 - chloro - diphenylmethane with a boiling point of 118–121° C./0.1 Hg used as a starting material in this example may be obtained in a high yield by reducing 2 - benzoyl - 5 - chloroaniline with hydrazine hydrate in a basic medium and treating the obtained 2-benzyl - 5 - chloroaniline with a 20% phosgene solution in toluene.

*Example 5*

9.0 g. of o - aminodibenzyl are dissolved in 10 ml. of absolute toluene. This solution is added drop by drop to 365 ml. of a 20% solution of phosgene in toluene, while it is stirred and cooled. The mixture is heated to its boiling temperature, and dry phosgene is introduced during 30 minutes into the solution heated under reflux. Excess phosgene is then eliminated by bubbling nitrogen through the reaction mixture. The toluene is distilled off in vacuo. The residue (11.0 g.) is dissolved in 20 ml. of o-dichlorobenzene. The solution is added drop by drop to a stirred suspension of 5.5 g. of aluminium chloride in 40 ml. of dichlorobenzene, whereby the reaction mixture reaches a temperature of 35–40° C. It is then heated for an hour at 130° C. The reaction mixture is cooled to room temperature and mixed with 50 ml. of 1-n hydrochloric acid. The dichlorobenzene is eliminated by distillation with steam. The distillation residue is dissolved in chloroform and washed until a neutral pH is reached. After crystallization from acetone/ether, 4.0 g. of 5,6,11,12 - tetrahydro - 6 - oxo - dibenz[b,f]azocine are obtained in the form of colourless crystals, which upon recrystallization from chloroform/ether show a melting point of 240–243° C.

Proceeding in the same way as in the above-mentioned examples and starting from the corresponding isocyanates, additional heterocyclic compounds as mentioned, by way of example, in the following table, can be obtained with the stated yields.

In the table the following abbreviations are used: ac for acetone, e for ether, ch for chloroform, d for dioxane, dmf for dimethylformamide, gaa for glacial acetic acid, py for pyridine, wa for water, and pe for petroleum ether.

For indicating the position of the substituents in the third column of the table, the numbering prescribed for the corresponding types of compounds by Patterson, The Ring Index, is employed, as in the preceding description (RRI 3674 for dibenzo[b,f][1,4]thiazepine compounds, RRI 3672 for dibenz[b,f][1,4]oxazepine compounds, and RRI 3690 for morphanthridine compounds).

TABLE

| Ex. | X | Substituents in the benzene nuclei | Melting point, deg. C. | Yield (Percent of theoretical yield) |
|---|---|---|---|---|
| 6 | —S— |  | 259–260 (from gaa) | 90 |
| 7 | —S— | 2-F | 257–258 (from gaa) | 97 |
| 8 | —S— | 2-Br | 270–271 (from ac) | 91 |
| 9 | —S— | 2-CH₃ | 239–240 (from ch) | 98 |
| 10 | —S— | 2-C(CH₃)₃ | 239–242 (from gaa) | 80 |
| 11 | —S— | 4-CH₃ | 253–254 (from ac) | 98 |
| 12 | —S— | 8-Cl | 302–303 (from ac) | 98 |
| 13 | { —O— / —O— } | 1-CH₃ / 3-CH₃ | 229–231 (from ac/e) / 218–219 (from gaa) | 96 |
| 14 | —O— | 2-Cl | 244–245 (from gaa) | 94 |
| 15 | —O— | 2-CH₃ | 193–196 (from ac) | 91 |
| 16 | —O— | 4-Cl | 256–259 (from gaa) | 94 |
| 17 | —O— | 4-CH₃ | 192–194 (from ac) | 85 |
| 18 | —O— | 7-Cl | 295 (from gaa) | 81 |
| 19 | —O— | 8-Cl | 258–261 (from ac) | 80 |
| 20 | —O— | 2-Cl; 8-Cl | 293–294 (from gaa) | 85 |
| 21 | —O— | 6-Cl | 284–285 (from gaa) | 97 |
| 22 | —O— | 2-F | 245–246 (from ac) | 89 |
| 23 | —O— | 2-Br | 240–241 (from gaa) | 91 |
| 24 | —O— | 1-CH₃; 4-CH₃ | 251–253 (from d) | 91 |
| 25 | —O— | 3-CH₃; 4-CH₃ | 213–214 (from ch/e) | 97 |
| 26 | —CH₂— |  | 201–203 (from ac/wa) | 96 |
| 27 | —CH(CH₃)— |  | 203–206 (from ac) | 87 |
| 28 | —S— | 2-OCH₃ | 128–129 (from ac/e) | 90 |
| 29 | —S— | 4-Cl | 271–273 (from d) | 93 |
| 30 | { —S— / —S— } | 8-OCH₃ / 8-OH | 221–223 (from ac) / 298–300 (from d/e) | 90 |
| 31 | —S— | 4-Cl; 8-Cl | 287–288 (from gaa) | 91 |
| 32 | —S— | 1-Cl; 4-CH₃ | 319–321 (from dmf) | 91 |
| 33 | —S— | 4-CH₃; 7-Cl | 318–321 (from gaa) | 96 |
| 34 | —S— | 4-CH₃; 8-Cl | 298–300 (from gaa) | 93 |
| 35 | —O— | 3-Cl | 266–267 (from py) | 89 |
| 36 | —O— | 4-C₂H₅ | 153–154 (from gaa) | 91 |
| 37 | —O— | 1-Cl; 4-Cl | 221–222 (from gaa) | 71 |
| 38 | —O— | 2-Cl; 4-Cl | 260–264 (from gaa) | 87 |
| 39 | —O— | 4-Cl; 8-Cl | 296–297 (from gaa) | 96 |
| 40 | —O— | 1-Cl; 4-CH₃ | 258–259 (from gaa) | 88 |
| 41 | —O— | 4-CH₃; 7-Cl | 310–311 (from d) | 92 |
| 42 | —O— | 4-CH₃; 8-Cl | 259 (from d) | 87 |
| 43 | —CH₂— | 2-Cl | 261–262 (from ac) | 93 |
| 44 | —CH₂— | 8-Cl | 239–240 (from ch/pe) | 89 |

We claim:
1. Process for the preparation of heterocyclic compounds of the class consisting of (A) compounds of the general formula:

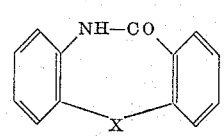

(I)

wherein X denotes a member of the group consisting of oxygen, sulfur, methylene, ethylene, substituted methylene, and substituted ethylene, and (B) derivatives of (A) which contain in one or both benzene nuclei one or several substituents; which comprises subjecting isocyanates of the general formula:

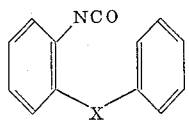

(II)

wherein X has the above-mentioned meaning, or derivatives thereof which contain substituents in one or both benzene nuclei, to cyclization by treatment with a condensing agent.

2. A process in accordance with claim 1, wherein the cyclization is performed at a temperature in the range between 80 and 160° C.

3. A process in accordance with claim 1, wherein the condensing agent used belongs to the group consisting of aluminium chloride and polyphosphoric acid.

4. A process in accordance with claim 1, wherein the cyclization is performed in an inert solvent having a boiling point in the range between 80 and 160° C., and using anhydrous aluminium chloride as the condensing agent.

References Cited
UNITED STATES PATENTS 3,337,536  8/1967  Schmutz et al. _____ 260—293.3

JOHN D. RANDOLPH, *Primary Examiner.*

WALTER A. MODANCE, *Examiner.*

R. T. BOND, *Assistant Examiner.*